Figure 8:
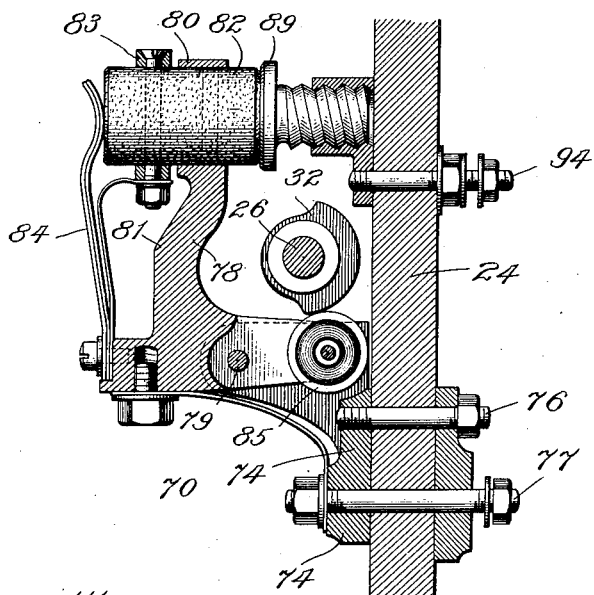

J. L. SCHUREMAN.
ELECTRICAL STARTING DEVICE.
APPLICATION FILED SEPT. 20, 1907.
928,547.
Patented July 20, 1909.
9 SHEETS—SHEET 1.
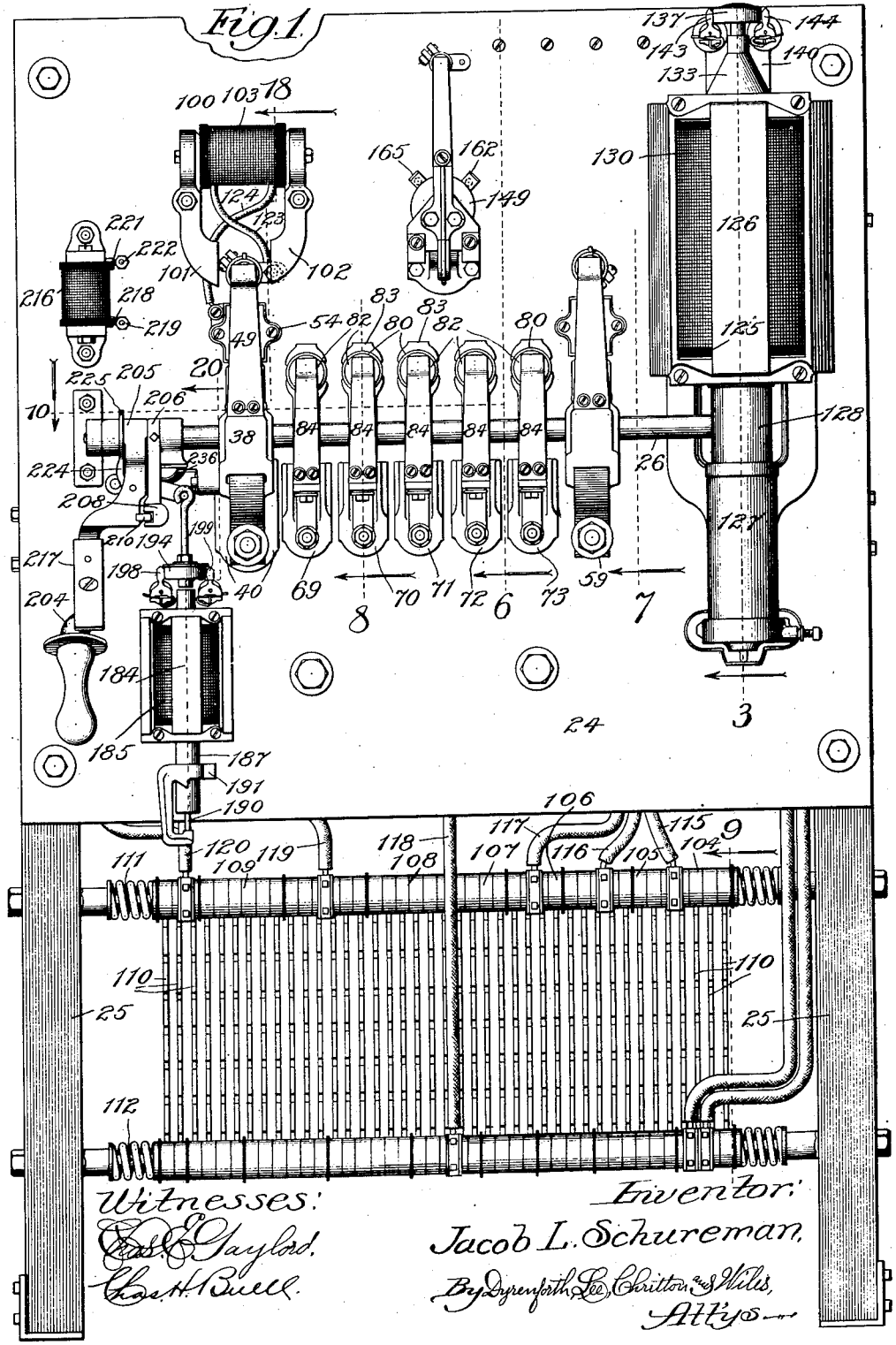
Witnesses:
Chas E Gaylord.
Chas H Buell.
Inventor:
Jacob L. Schureman,
By Dyrenforth, Lee, Chritton & Wiles,
Attys.

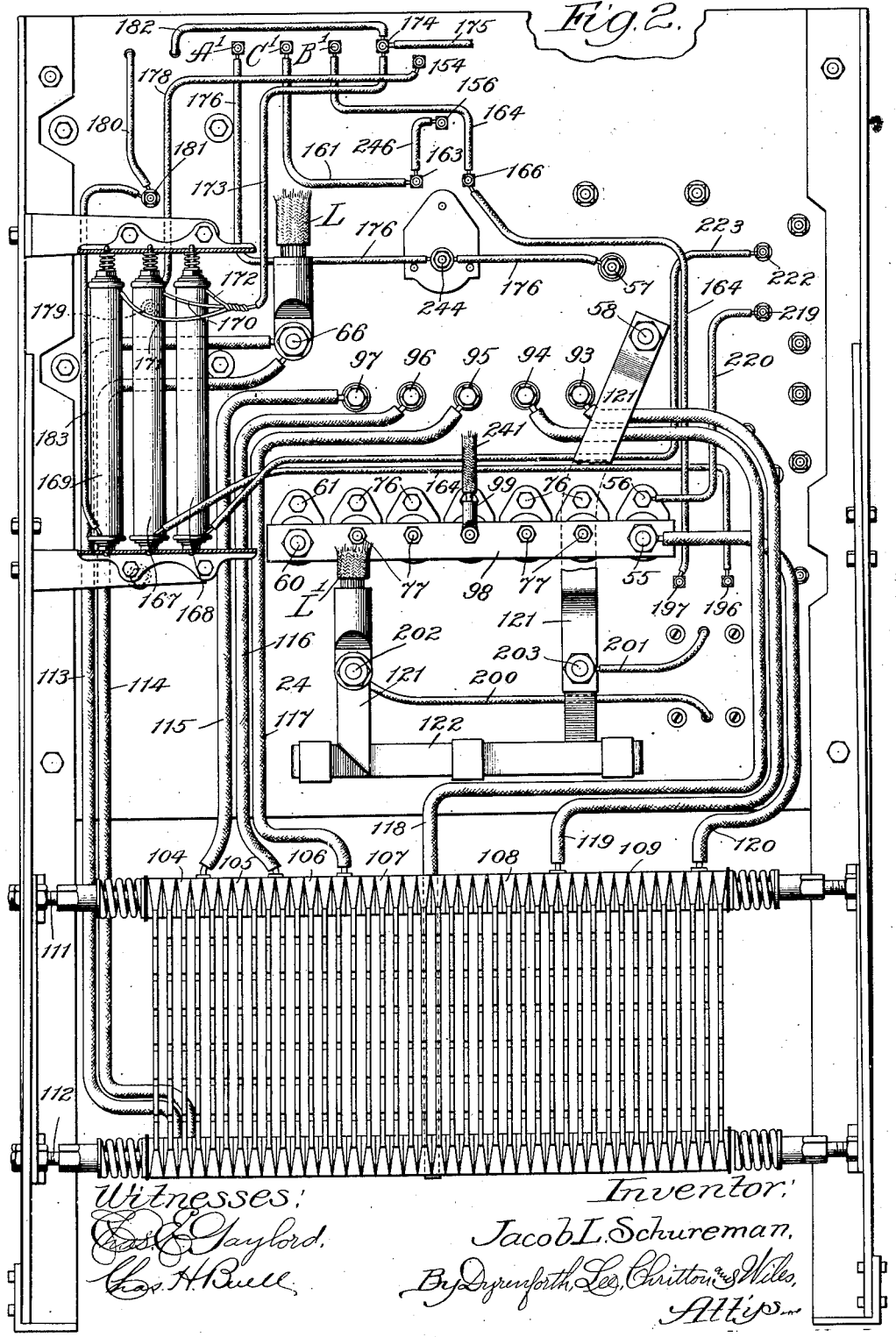

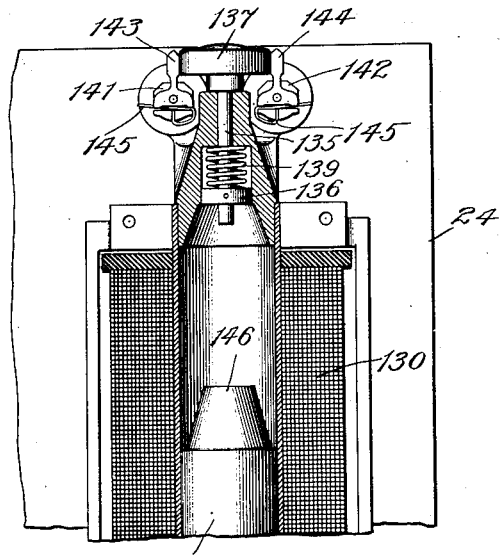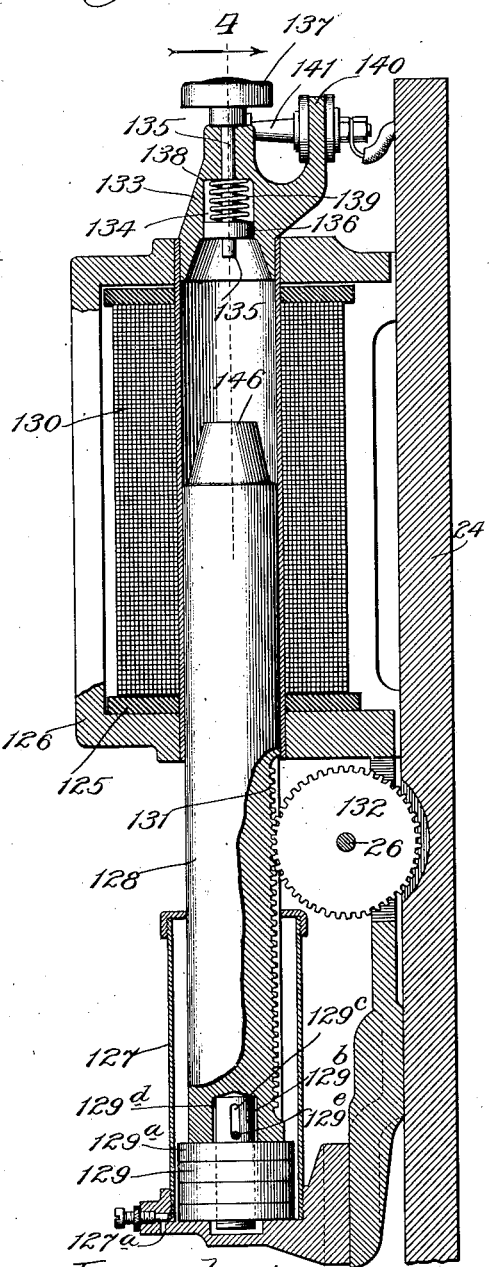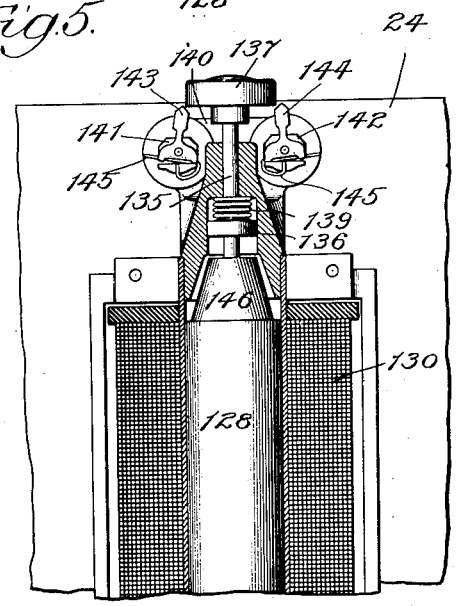

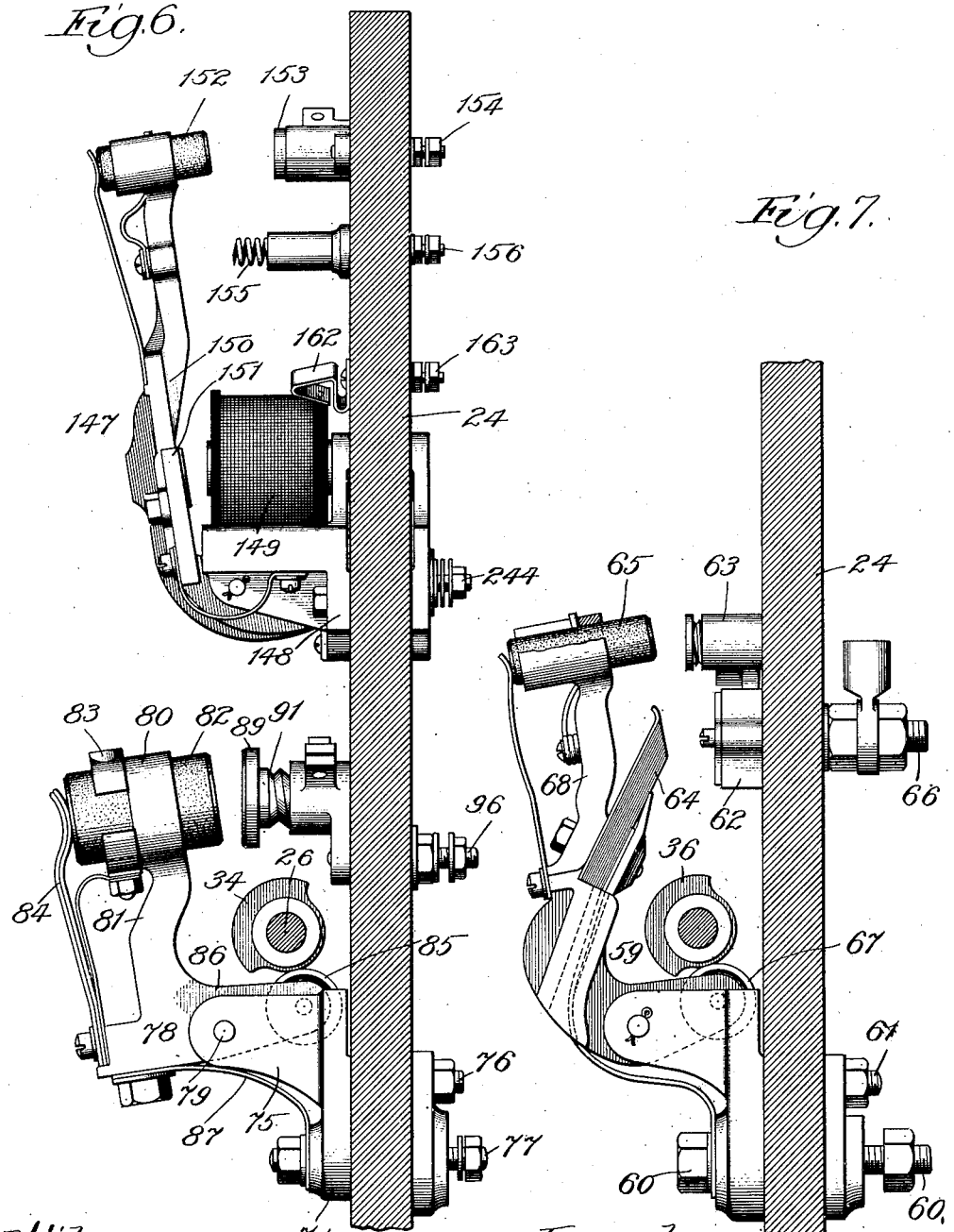

J. L. SCHUREMAN.
ELECTRICAL STARTING DEVICE.
APPLICATION FILED SEPT. 20, 1907.

928,547.

Patented July 20, 1909.
9 SHEETS—SHEET 5.

Witnesses:

Inventor:
Jacob L. Schureman,

J. L. SCHUREMAN.
ELECTRICAL STARTING DEVICE.
APPLICATION FILED SEPT. 20, 1907.
928,547.
Patented July 20, 1909.
9 SHEETS—SHEET 6.
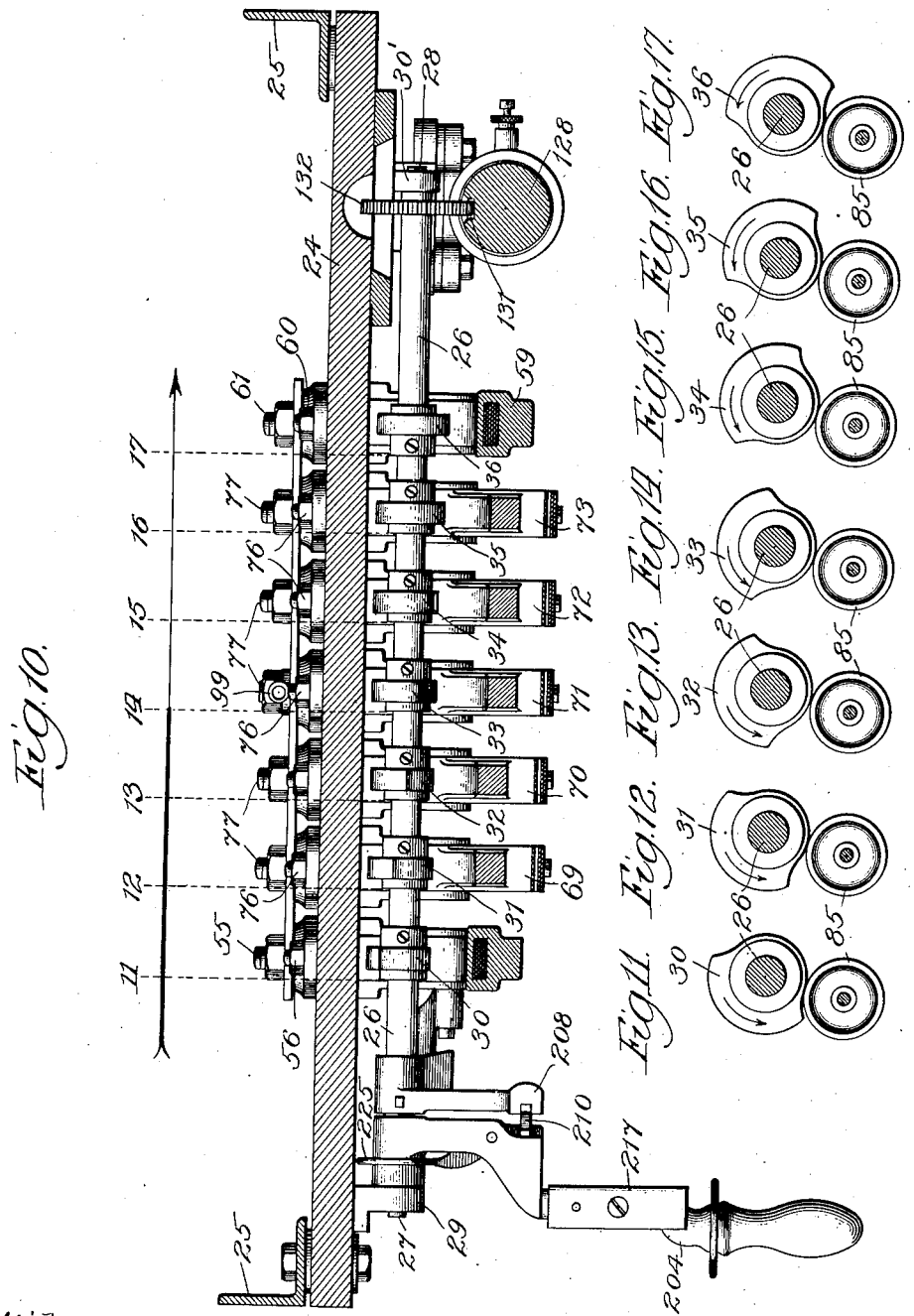

J. L. SCHUREMAN.
ELECTRICAL STARTING DEVICE.
APPLICATION FILED SEPT. 20, 1907.
928,547.
Patented July 20, 1909.
9 SHEETS—SHEET 7.
Fig. 18.
Fig. 19.
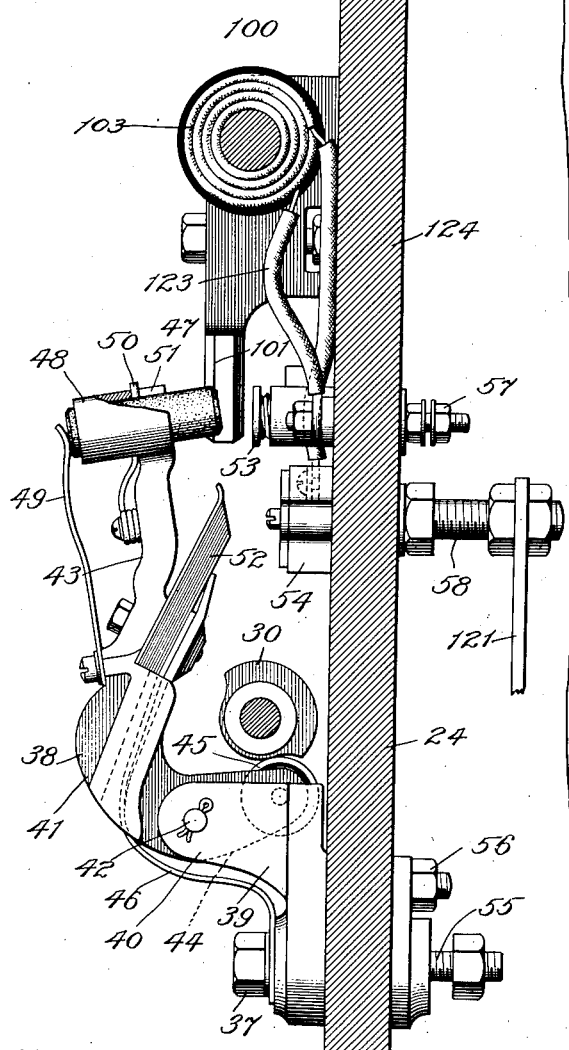
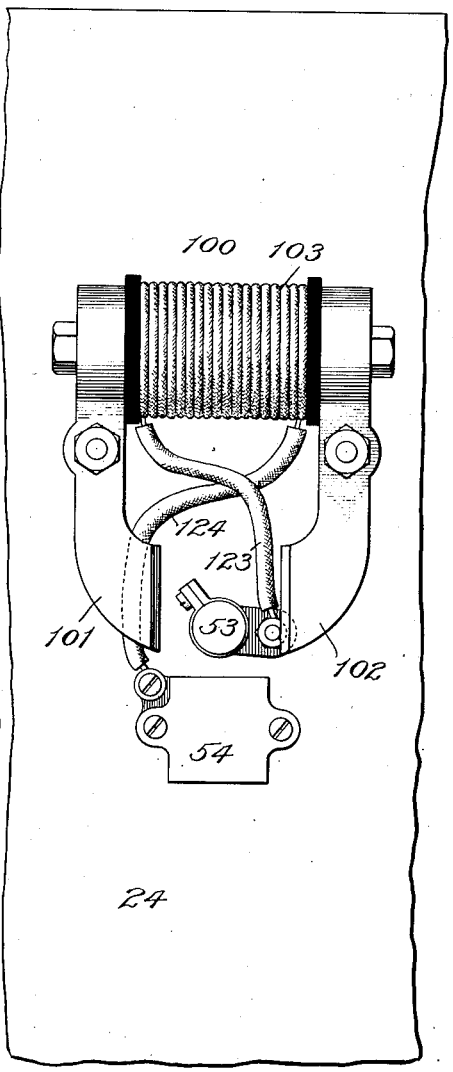
Witnesses:
Chas. E. Gaylord.
Chas. H. Buell.
Inventor:
Jacob L. Schureman,
By Dyrenforth, Lee, Chritton & Wiles,
Attys.

J. L. SCHUREMAN.
ELECTRICAL STARTING DEVICE.
APPLICATION FILED SEPT. 20, 1907.
928,547.
Patented July 20, 1909.
9 SHEETS—SHEET 8.
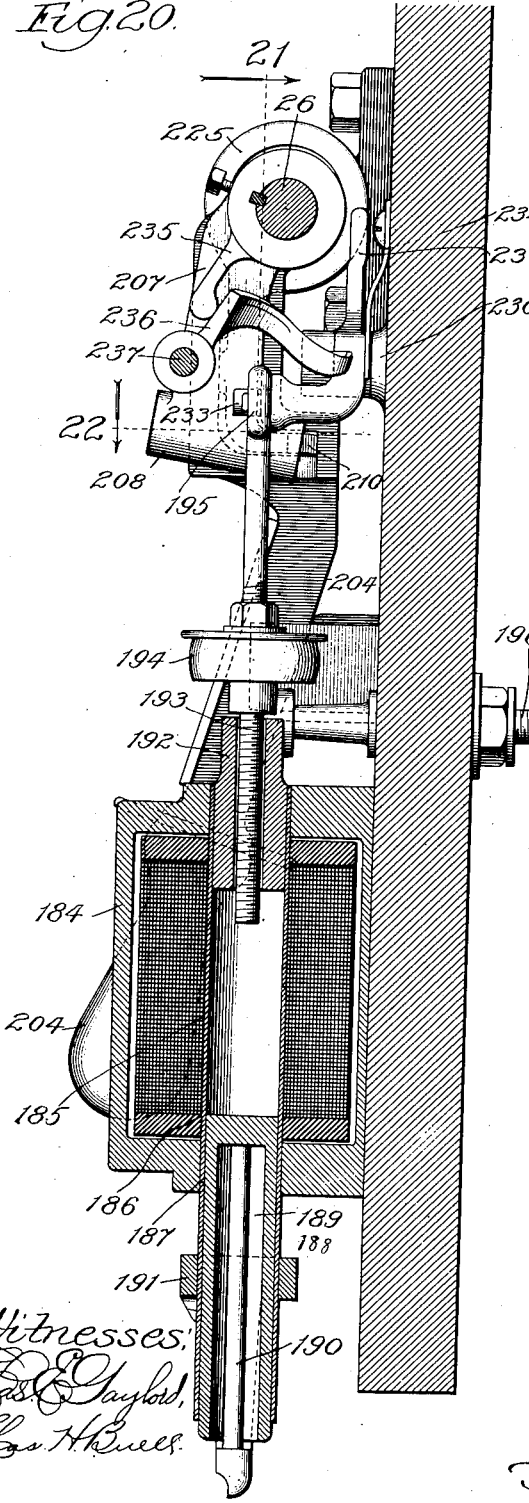
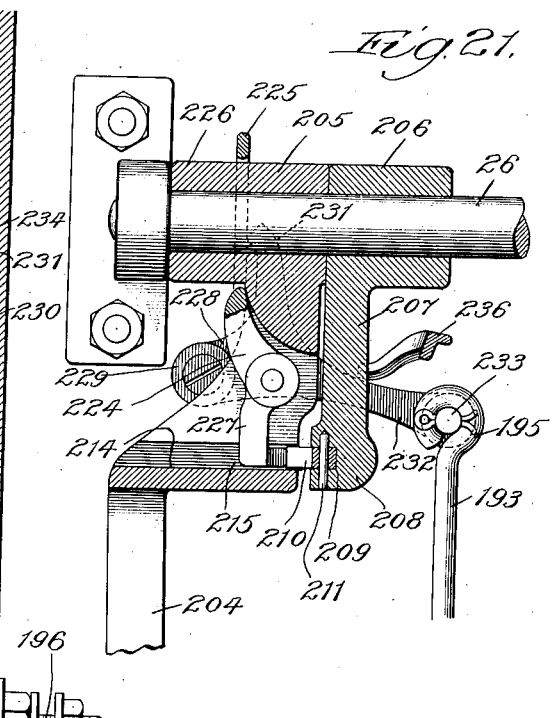
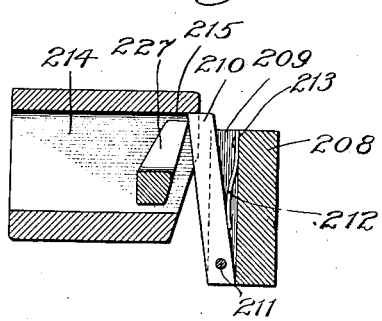
Witnesses:
Inventor:
Jacob L. Schureman,
By Dyrenforth, Lee, Chritton & Wiles,
Attys.

J. L. SCHUREMAN.
ELECTRICAL STARTING DEVICE.
APPLICATION FILED SEPT. 20, 1907.

928,547.

Patented July 20, 1909.
9 SHEETS—SHEET 9.

Witnesses:
Chas. E. Gaylord.
Ralph A. Schaefer.

Inventor:
Jacob L. Schureman,
By Dyrenforth, Lee, Chritton and Wiles,
Attys.

UNITED STATES PATENT OFFICE.

JACOB L. SCHUREMAN, OF CHICAGO, ILLINOIS, ASSIGNOR TO J. L. SCHUREMAN COMPANY, OF CHICAGO, ILLINOIS, A CORPORATION OF ILLINOIS.

ELECTRICAL STARTING DEVICE.

No. 928,547.　　　　Specification of Letters Patent.　　　Patented July 20, 1909.

Application filed September 20, 1907. Serial No. 393,775.

*To all whom it may concern:*

Be it known that I, JACOB L. SCHUREMAN, a citizen of the United States, residing at 1773 Sheridan road, Chicago, in the county of Cook and State of Illinois, have invented a new and useful Improvement in Electrical Starting Devices, of which the following is a specification.

My invention relates to improvements in devices for controlling the flow of current from a main line through a circuit to be supplied, including a resistance, such as an electric motor or other electrical device or apparatus, in a manner to cause the current from the main line to be fed gradually to the circuit to be supplied through the interposition of resistances adapted to be successively cut out, to prevent overloading the circuit to be supplied including the resistances above stated.

My principal object, generally stated, is to provide a simple and novel construction of starting-device which shall be relatively economical to manufacture and reliable in operation.

Another object is to provide a construction of starting-device which shall be equipped with automatically-operating means for preventing too rapid introduction of the current from the main line into the circuit to be supplied, and thus prevent overloading of the resistance in the circuit; and other objects are to provide improved electrically-operated means for actuating the switches and for cutting out the resistances, and improved means for manually operating the switches, either independently of or in combination with the electrical switch-operating means referred to.

Figure 9:
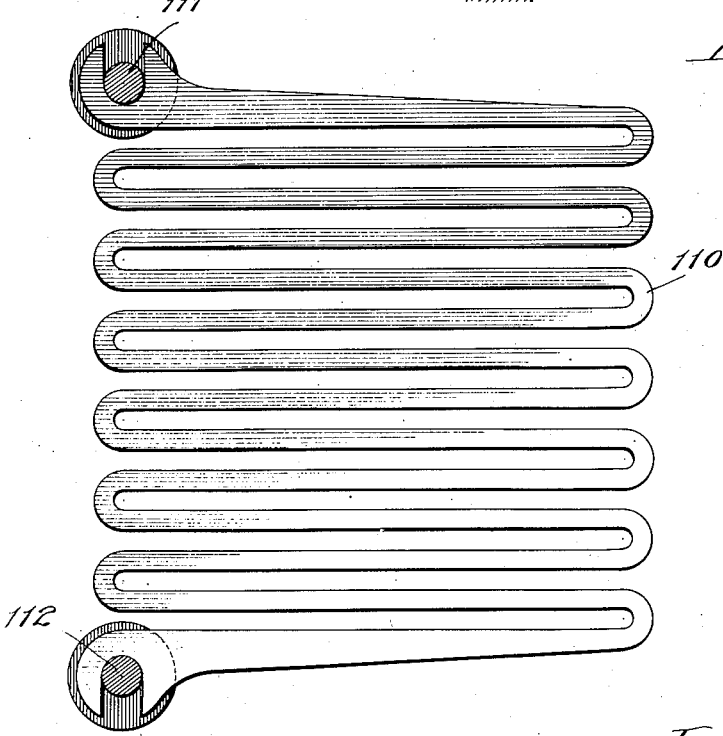

Referring to the accompanying drawings—Figure 1 illustrates, by a view in front elevation, a starting-device embodying my invention, showing means for electrically operating the switches and also means for operating them by hand. Fig. 2 is a view of the same in rear elevation, showing the various electrical connections between the parts of the starting-device. Fig. 3 is a section taken at the line 3 on Fig. 1, viewed in the direction of the arrow and enlarged. Fig. 4 is a broken section taken at the line 4 on Fig. 3, viewed in the direction of the arrow and enlarged, showing the position the contact-making-and-breaking device of the switch-actuating solenoid assumes during the operation of closing the resistance-cut-out-switches. Fig. 5 is a view like Fig. 4, showing the position the contact-making-and-breaking device assumes after all the switches have been closed to cut out the resistance in the circuit to be supplied from the main line. Fig. 6 is a section taken at the line 6 on Fig. 1, viewed in the direction of the arrow and enlarged, showing one of the cut-out switches and the switch for closing the circuit through the cut-out-switch-operating solenoid, in side elevation, the positions of the switches illustrated being those they assume when the electrically-operated means for operating the cut-out switches is in normal inoperative position. Fig. 7 is a section taken at the line 7 on Fig. 1, viewed in the direction of the arrow and enlarged, this view showing the last cut-out switch to operate, in the position it assumes when open. Fig. 8 is a section taken at the line 8 on Fig. 1, viewed in the direction of the arrow and enlarged, this view showing the cut-out switch through which the section is taken, in the position it assumes when closed. Fig. 9 is a section taken at the line 9 on Fig. 1, viewed in the direction of the arrow and enlarged, showing one of the elements of a number of resistance groups, in side elevation. Fig. 10 is a section taken at the line 10 on Fig. 1, viewed in the direction of the arrow and enlarged, showing the cut-out-switch handle for manually closing the switches, in a horizontal position. Figs. 11 to 17, inclusive, are sections taken at the lines 11 to 17 inclusive, respectively, on Fig. 10, viewed in the direction of the arrow and enlarged, and showing the relative positions of the various cut-out-switch-operating cams when they are in their normal positions, viz., the positions they assume when the cut-out switches are all open and the handle is in the position illustrated in Fig. 1. Fig. 18 is a section taken at the line 18 on Fig. 1, viewed in the direction of the arrow and enlarged, showing the blow-out magnet in section, and the first of the switches to be operated by the cam-mechanism to cause the current to traverse the circuit to be supplied, in elevation, this switch being shown in open condition. Fig. 19 is a face view of the blow-out-magnet device. Fig. 20 is a section taken at the irregular line 20, on Fig. 1, viewed in the direction of the arrow and enlarged. Fig. 21 is a section taken at the line 21 on Fig. 20, viewed in the direction of the arrow and partly broken and enlarged. Fig. 22 is a section of a detail of the means for operating the switches by a hand-device, the view being taken at the line 22 on Fig. 20, viewed in the direction of the arrow and enlarged; and Fig. 23, a view in the nature of a diagram showing the circuit connections of my improved starting-device, as illustrated in Fig. 1, with a motor for supplying a fluid-pressure reservoir and an electric fluid-pressure gage for connection with the reservoir, for controlling the starting and stopping of the motor, through the medium of the starting-device, to maintain the desired pressure in the reservoir.

The supporting frame of the device illustrated comprises a supporting plate, or board, 24, preferably supported in vertical position on uprights 25, 25. A shaft 26 journaled at its reduced ends 27, 28 in bearings 29, 30', respectively, to extend horizontally across the front of the plate 24, has secured on it a series of cams 30, 31, 32, 33, 34, 35 and 36, spaced apart and each occupying a different position about the circumference of the shaft, as represented in Figs. 11 to 17, inclusive. Secured as by a bolt 37 to the plate 24 at a point below the shaft 26, to extend at its free end over and above the shaft, is a switch 38, which is the first of a series to close when the shaft 26 is operated, as hereinafter described. The switch 38 may be of any suitable variety, the one shown comprising a base 39 fixed to the plate by a bolt 37 and having two parallel spaced lugs 40, 40; an arm 41, in the nature of a bell-crank lever, pivoted near its angle to the base, as indicated at 42, between the lugs 40, to extend at its long arm 43 over the shaft 26, and having journaled in its shorter arm 44 a roller 45, which, under the action of a spring 46 secured at its opposite ends to the base 39 and arm 41, is held in constant engagement with the cam 30 on the shaft 26; a carbon electrode 47 slidably mounted in a sleeve 48 on the free end of the arm 43 and normally rearwardly pressed by a flat spring 49 secured to the arm 43 and bearing at its free end against the outer end of the electrode 47; a pin 50 fixed in the electrode 47 and sliding in a slot 51 in the sleeve and serving to limit the movement of the electrode 47; a main electrode 52, preferably of laminated copper, secured to the arm 43; and an auxiliary contact 53 and a main contact 54 secured to the plate in a position to be engaged by the electrodes 47 and 52, respectively, when the switch closes, as hereinafter described. The base 39 of this switch has two binding-posts 55, 56, on the rear of the plate, and the contacts 53, 54 likewise have binding-posts 57, 58, respectively, also located on the rear of the plate. Secured to the plate 24 below the shaft 26, near its opposite end and in line with the cam 36, is a switch 59, like the switch 38, the switch 59 being the last to close in the operation of cutting out the resistance in the circuit to be supplied, as hereinafter described. As the switch 59 is a duplicate of the switch 38, it is not deemed necessary to describe its construction in detail. The base of the switch 59 is secured to the plate by bolts 60, 61, and the contacts 62, 63, which are united and coöperate with the electrodes 64, 65, respectively, of the switch 59, have a binding-post 66, to which a main-line-wire L may be attached. The roller 67 of this switch is caused to bear against the cam 36 in the manner described of the switch 38. It will be noted that owing to the positioning of the cams 30 and 36 on the shaft 26, as hereinbefore described, the cam 30, assuming the shaft 26 to rotate from left to right in Fig. 1, is in position to engage the roller 45 and force the switch-arm 43 rearwardly immediately upon turning the shaft, whereas the cam 36 is so positioned as not to engage the roller 67, for swinging the arm 68 of the switch 59 until the shaft 26 has made about one-half a revolution. Secured to the front of the plate 24 below the shaft and opposite to the cams 31, 32, 33, 34 and 35 is a series of switches 69, 70, 71, 72 and 73, respectively, which may be of any suitable construction. Those shown in the drawings are each of the same construction, including a base 74 provided with spaced lugs 75, 75, and secured to the plate 24 below the shaft, as by bolts 76, 77; an arm 78, in the nature of a bell-crank, pivoted near its angle, as indicated at 79, to the base 74 between the lugs 75, and having a slotted head 80 at the end of its long arm 81, an electrode 82, preferably of bar-carbon, sliding in the slotted head 80 and surrounded by a sleeve 83 secured to it beyond the head; a flat spring 84 fastened to the arm 78 and bearing at its free end against the outer end of the electrode 82; a roller 85 journaled in the short rearwardly-extending end 86 of the arm 78 in the path of the opposed respective cam on the shaft; and a spring 87 secured to the base 74 and the arm 78 for holding the latter in normally retracted position relative to the plate. Secured to the front side of the plate 24 are contacts 88, 89, 90, 91, 92, all of these contacts being shown in the diagram of Fig. 23 only. These contacts are arranged in a series to be engaged by the respective electrodes of the switches 69 to 73, inclusive, these contacts having binding-posts 93, 94, 95, 96 and 97 on the rear side of the plate. The base 39, bases 74 and the base of the switch 59, are all electrically connected together on the rear side of the plate by a bus-bar 98, through the medium of the bolts 60, 77 and 55, the bus-bar being provided with a socket binding-post 99. Owing to the positioning of the cams on the shaft 26 the cut-out switches, beginning with the switch 38 and ending with the switch 59, when the shaft is rotated, are caused to successively close and engage the opposed contacts, as described.

A blow-out magnet 100 of usual construction is secured on the front side of the plate 24, in a position to cause its pole-pieces 101, 102 to extend on opposite sides of the contact 53 and thus serve, through the energizing of its coil 103, to blow out the arc formed between the electrode 47 and the contact 53 when the switch is operated to open the circuit, as hereinafter described. A series of resistance-groups 104, 105, 106, 107, 108 and 109 formed of coils 110 of usual construction, are supported below the plate on rods 111, 112, fixed in the standards 25.

The circuit connections of the apparatus as far as described are as follows: The resistance-group 104 is connected at one end by wires 113, 114 to the binding-post 66. A wire 115 leads from the opposite end of this group to the contact 97; wires 116, 117, 118 and 119 lead from the groups 105, 106, 107 and 108, respectively, to the contacts 96, 95, 94 and 93, respectively; a wire 120 leads from the extreme end of resistance-group 109 to the binding-post 55 of the bus-bar 98; and a wire 121 leads from the binding-post 58 to the other main line-wire $L^1$, the wire 121 having interposed in it a section 122 formed of material of low resistance. The terminals 123, 124 of the blow-out coil 103 are connected with the contacts 53 and 54, respectively. Thus, as soon as the switch 38 is closed by turning the shaft, as hereinafter described, the current will pass through the wire $L^1$, contact 54, switch-arm and base of the switch 38, thence to the bus-bar 98, through the wire 120 to resistance-group 109, thence through the remaining groups and through the wires 113, 114 to line-wire L. The shunt connections between the coil 103 and the contacts 53 and 54 cause the coil 103 to be energized as soon as the contact 54 and the electrode 52 separate, as the course of the current is then from the contact 54 through the coil 103, to the contact 53, thence through the electrode 47, and thence through the switch-arm and base of the switch 38. Thus, when the circuit through this switch is broken, as hereinafter described, the arc formed between the electrode 47 and the contact 53, the engagement of which parts is the last to be broken, is blown out. Further turning the shaft 26, after the switch 38 has been closed, causes the switches 69, 70, 71, 72 and 73 to be successively closed. As these switches close, the resistance-groups controlled by them, as hereinbefore described, are caused to be cut out of the circuit, the current then passing from the bus-bar 98 through the switches as they become closed. The switch 59, which is the last to close, controls the cutting-out of the last resistance-group, viz., group 104, and thus when this switch closes the current passes directly from the bar 98 through the switch 59, contacts 62, 63, and through the binding-post 66 and wire 121 to the main-wire $L^1$, instead of passing through the group of intermediate switches and resistance-groups.

The described mechanism for cutting out the separate resistances may be operated by any suitable means for turning the shaft. In the starting-device illustrated in the drawings, I have shown the cut-out mechanism described as primarily operated through the medium of electrically-controlled means, and have also shown a hand-controlled device for turning the shaft in cases of emergency. It is, however, to be understood that the cut-out mechanism described may be used in connection with hand-operated means without the inclusion of electrically-controlled means for operating it.

The electrically-controlled device for operating the cut-out switches includes a solenoid 125 inclosed in a frame 126 secured to the front of the plate 24, a cylinder 127 below the solenoid and provided with a valved air-passage $127^a$ at its lower end, a plunger 128 fitting at its lower end in the cylinder 127 and projecting at its opposite end through the cylinder and into the bore 130 formed in the center of the solenoid, the normal position of plunger 128 being that shown in Fig. 3. The plunger is provided with a section 129 formed of washers $129^a$ and having a stem $129^b$ provided with a slot $129^c$ and fitting at its upper end in an opening $129^d$ in the lower end of the bar in which it is confined by a pin $129^e$ secured in the bar. The plunger also carries a rack 131 which engages with a pinion 132 carried by the shaft 26. Thus, when the plunger 128 is raised by the action of the solenoid when energized, as hereinafter described, the shaft 26 turns and the switches operated by the cams carried by the shaft are swung to closed position. When the solenoid becomes deënergized, as hereinafter explained, the weight of the plunger 128 causes it to descend, thereby turning the shaft 26 in the opposite direction and successively opening the resistance cut-out switches hereinbefore referred to. On the top of the frame 130 is a casting 133 having a vertical opening 134 through it alining with the bore 130 of the solenoid, and in this opening is confined a plunger 135 provided above its inner lower end with a head 136, and on its outer upper end with a contact-disk 137. Between the head 136 and a shoulder 138 in the opening 134 is confined a spring 139 for holding the plunger 135 in normal downwardly-pressed condition. An arm 140 extending rearwardly and upwardly from the casting 133 has insulated horizontal fingers 141, 142 projecting through it on opposite sides of the disk 137, these fingers supporting contacts 143, 144, respectively, pivoted to them These contacts, through the medium of springs 145, are yieldingly pressed toward each other at their upper ends to bear against the periphery of the contact-disk when it is in the normal position illustrated in Fig. 4. The lower end of the plunger 135 projects below the head 136 into the path of movement of the reduced upper end-portion 146 of the plunger 128 which, when raised, as hereinafter described, to the position illustrated in Fig. 5, a position this plunger assumes immediately after the switch 59 has been closed, strikes the plunger 135, thereby raising it and moving the disk 137 out of contact with the spring-controlled contacts 143, 144. Secured on the front of the plate 24 is a magnet-switch 147 for making and breaking the circuit through the solenoid 125. This switch may be of any suitable construction, the one shown comprising a base 148, an electromagnet 149 secured to it, an arm 150 pivoted to the base 148 and extending at its free end over the magnet 149, opposite to it which carries an armature 151, a sliding electrode 152, a carbon-contact 153 secured to the plate 24 and having a binding-post 154, this contact being in position to be engaged by the electrode 152, and a spring contact 155 secured to the plate 24 and terminating in a binding-post 156, this contact being so positioned as to adapt it to be engaged by a portion of the arm of this switch when closed.

Any suitable means for energizing the solenoid-actuating switch 147 may be employed. The one shown in the drawings is the one preferred when the circuit controlled by the resistance cut-out switches includes a motor for operating a pump for maintaining a certain degree of pressure in a reservoir, such as one for containing air. The means shown comprise a pressure-gage 157 of a well-known construction which may be connected with a reservoir (not shown) in a well-understood manner and provided with two contacts A and B which may be made adjustable as is common in devices of this character and a pointer C movable between the contacts A and B and actuated by fluctuations in the reservoir, in a well-known manner, the pointer and contacts being each insulated from the other. The contacts A and B connect with binding-posts $A^1$ and $B^1$, respectively, on the rear of the plate 24 through wires 158, 159, respectively, and the pointer C is connected with a binding-post $C^1$ on the back of the plate 24 through a wire 160. The other circuit connections between the gage 157 and the switch 147 and the main line for closing the switch, are as follows: A wire 161 connects the binding-post $C^1$ with a terminal 162 of the coil 149 at its binding-post 163, and a wire 164, which has interposed in it a circuit-breaking device, hereinafter described, connects with the other terminal 165 of the coil 149, through a binding-post 166, and extends to the lower end of the middle resistance-coil 167, of a group of coils 167, 168, 169, from which wires 170, 171, 172, respectively, are united and form a wire 173, which terminates at a binding-post 174. From the binding-post 174 a wire 175 (shown in the diagram) extends to and connects with the main line-wire L. A wire 176 leads from the binding-post $A^1$ and connects with the contact 53 through the binding-post 57, and a wire 177 leads from the binding-post $B^1$ to the binding-post 166.

The circuit connections for operating the solenoid 125 when the switch 147 is closed, are as follows: A wire 178 leads from the binding-post 154 to terminal 179 of the solenoid; a wire 180 connects the other terminal of the solenoid through a binding-post 181 with the spring-contact 143, and a wire 182 connects the other spring-contact 144 with the binding-post 174. Thus, as long as the switch 147 remains closed, a current flows through the solenoid 125.

The starting-device is constructed to cause the current from the main line, after the plunger 128 in its upward movement disengages the disk 137 from the contacts 143, 144, to pass through a resistance in the solenoid circuit, thereby enabling the use of a heavy current for operating the solenoid, and a current of less strength for maintaining the plunger in raised position. Thus, any danger of overheating the solenoid is avoided. The connection for enabling this result to be produced consists of a wire 183 leading from the contact 143 at its binding-post 181, to the lower end of the resistance-coil 169, the circuit thus established being hereinafter described.

To prevent too rapid successive closing of the resistance cut-out switches and consequent overloading of current to be supplied from the main line, I provide means for automatically breaking the circuit through the solenoid 125, should the current through the motor exceed the amount required. These means comprise a casing 184 secured to the plate on its front side, a solenoid 185 confined in the casing and provided with a vertical bore 186, a tube 187 confined in the bore and projecting below the lower end of the solenoid, a bar 188 slidably confined in the tube 187 and having a longitudinal central recess 189 extending into it from its bottom to near its upper end, a finger 190 carried by the tube frame 191 adjustably secured on the tube 187, the finger 190 projecting into the recess in the bar and forming a stop for it, the frame being adjustable to permit the normal lowered position of the bar to change, for a purpose hereinafter described; a plug 192 in the upper end of the tube 187, a rod 193 sliding in a vertical opening in the plug and normally projecting into the tube below the lower end of the plug, and a contact disk 194 on the rod 193 near its upper end, the upper end of the rod beyond the disk having an eye 195, for a purpose hereinafter explained. Secured to the plate 24 adjacent to the disk 194 to extend on opposite sides of the latter, are binding-posts 196 and 197, carrying spring-pressed contacts 198 and 199, respectively, which engage the disk 194, as shown in Fig. 1, when the disk is in its lowered position. The contacts 198, 199 are like the contacts 143, 144. The contacts 198, 199 and disk 194 are interposed in the wire 164, and the terminals 200, 201 of the solenoid 185 are connected with the wire 121 below and above its section 122, as represented at 202 and 203, respectively. The solenoid is so constructed as to cause its bar 188 to be raised when the current is passing too rapidly through the solenoid and the circuit to be supplied. Raising the bar 188 causes it to engage the lower end of the rod 193 to raise it and move the disk 194 out of engagement with the contacts 198, 199, with the result of breaking the circuit through the wire 164, and consequently the circuit through the solenoid 125, thereby deënergizing it and allowing the plunger 128 to descend, thus causing the cut-out switches to be opened, as hereinbefore explained.

The hand-device for operating the shaft 26, which is shown in the drawings as an emergency device for use primarily in the illustrated structure should the solenoid 125 be out of commission, but which may be used independently of the solenoid, includes a handle 204 having a head 205 provided with an opening through it at which it is journaled on the shaft 26 near one end, by means of which connection with the shaft it may be turned thereon. Fixed on the shaft 26 closely adjacent to the head 205 of the handle 204 is a sleeve 206 having an extension 207 provided with a transversely-disposed head 208, which in the normal position of the shaft 26 extends substantially horizontally from the plate 24. The head 208 contains a longitudinal recess 209 in one side, in which a pawl 210 is pivoted near its outer end, as indicated at 211, a spring 212 being fastened between the free end of the pawl and the wall 213 of the recess 209, for yieldingly holding the free end of the pawl outwardly pressed, as represented in Fig. 22. The head 205 of the handle contains a recess 214, into which the pawl 210 normally projects when the handle is in its normal downwardly-extending position, illustrated in Figs. 20 and 22. Thus, when the handle is swung upward, the pawl 210 engages a wall 215 of the recess 214 and the sleeve 206 and its extension 207, and with them the shaft 26 and the various cams fixed to it which operate to successively close the resistance cut-out switches, these switches remaining closed as long as the handle remains in its upright position, and its engagement with the sleeve extension 207 on the shaft 26 is maintained. For releasably holding the handle 204 in upright position, I provide a retaining coil 216 which acts upon an armature 217 carried by the handle 204. The terminal 218 of the coil connects at its binding-post 219 with the binding-post 56 by a wire 220, and its other terminal 221 connects through its binding-post 222 with the lower end of resistance-group 168, through the medium of a wire 223. The circuit through the coil 216 is caused to be maintained, as hereinafter described, as long as the handle is moved out of its normal position.

To avoid overloading of the circuit to be supplied by current from the main line through the too rapid successive closing of the resistance cut-out switches, I provide means for automatically disengaging the handle 204 from the sleeve-extension 207. As shown, these means comprise a trip-device 224 pivoted in the recess 214 in the head 205 and having a strap extension 225 at its upper end loosely encircling a sleeve-extension 226 on the head 205, and a finger 227 normally resting against the free end of the pawl 210, and means for actuating the trip. The means last-referred to comprise: a member 228 having a head 229 at which the member is pivoted on a stud 230 projecting from the plate 24, an upwardly-extending finger 231 normally resting against the lateral face of the strap 225, and a laterally-extending arm 232 carrying a pin 233 to which the rod 193 is pivoted at its eye 195. A current is maintained through the solenoid 185, as hereinafter described, as long as any current passes through the circuit being supplied, viz., the one containing the resistance cut-out switches; and thus, when the handle 204 is turned upwardly so fast as to overload the circuit to be supplied, the plunger of the solenoid is raised, thereby raising the rod 193, as described, which turns the member 228 on its pivot, causing its finger 231 to press against the strap 225 and turn the trip-device 224 on its pivot, and thus cause the finger 225 to force the pawl 210 out of the recess 214, thereby disengaging the pawl from the head 205. As soon as the handle 204 is thus disconnected from the shaft 26, the means for returning the shaft to its normal position, which, in the construction shown is the plunger 128, though it may be any other suitable means, are thus brought into operation and the shaft cannot again be turned, nor any of the cut-out switches closed, until the handle is returned to the normal downwardly-extending position to again engage with the pawl 210, as described.

In operating the shaft 26 from the solenoid 125, it is desirable, should the disk 194 be raised out of engagement with the contacts 198, 199, as heretofore described, that this disk be held out of engagement with these contacts until the shaft 26 returns to its normal position under the action of the plunger 128 in its descent. To accomplish this, I provide a flat spring 234 adapted to bear against the member 228 and thus hold the latter and the disk 194 in raised condition until forced downward by the engagement of the lug 235 on the shaft 26, with the finger 236 mounted on the stud-shaft 237 and bearing at its inner end against the arm 232 of the member 228, the engagement of the lug 235 with the finger 236 taking place immediately before the shaft discontinues turning to its normal position.

Figure 23:
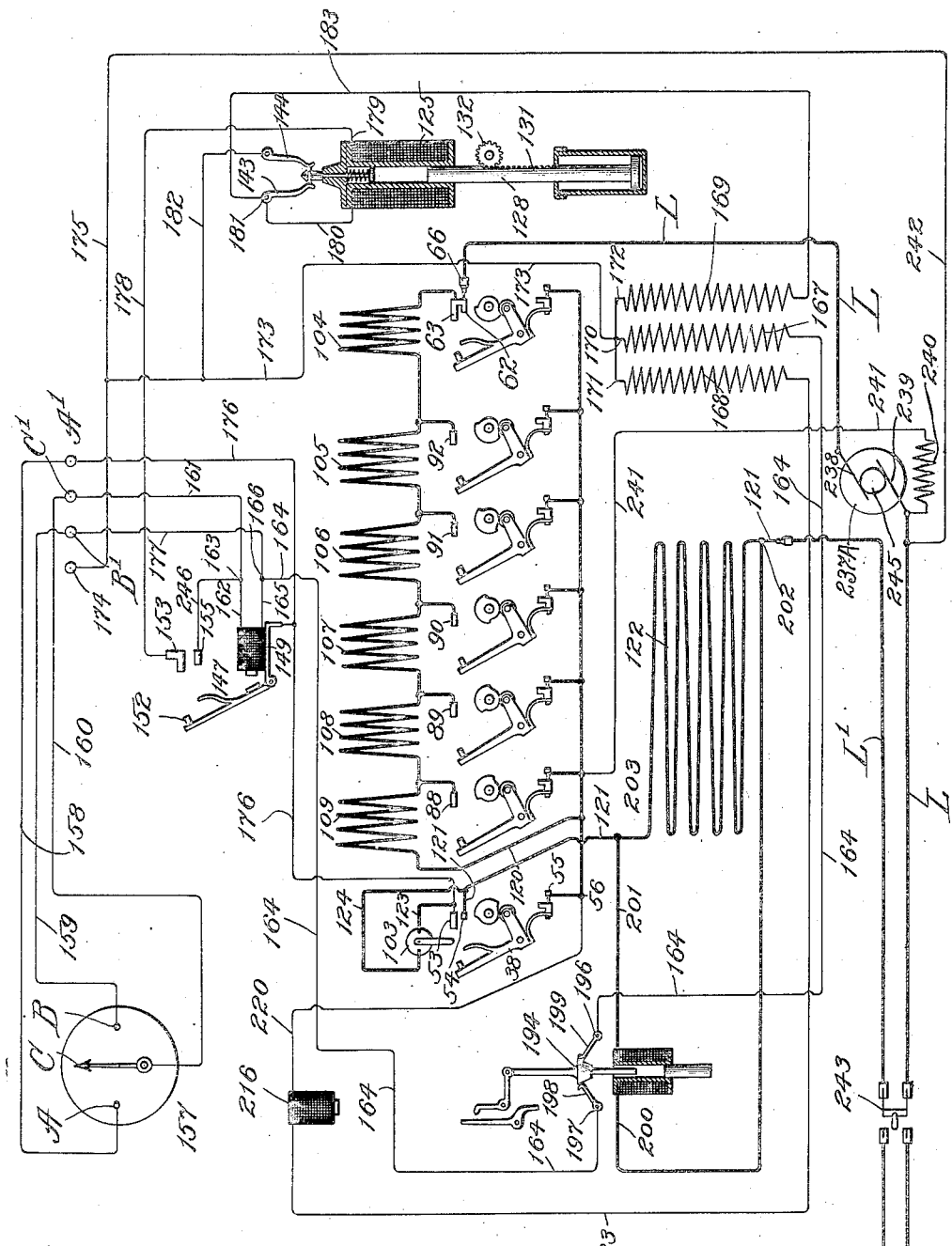

To facilitate the description of the operation of the starting-device, a diagram comprising Fig. 23 has been included in the drawings. This diagram shows my improved starting-device and its circuit connections, with a motor 237ᴬ for operating the pump (not shown), for maintaining a certain pressure in a fluid-pressure reservoir (not shown), connected with the pressure-gage 157, as hereinbefore explained. The commutator brushes 238, 239 of the motor are interposed in the line-wire L, and the field magnets 240 connect with the line-wire L at one point, and at its opposite point with the binding-post 99 on the bar 98 through the medium of a wire 241. The wire 175 before referred to, which leads from the binding-post 174, connects with the main line-wire L at a point intermediate the closing switch 243 and the point where the field-magnet connects with this main line-wire L.

When the pressure in the reservoir, before referred to, falls to a point indicating the lowest pressure desired in the reservoir, the pointer C contacts with the contact A of the pressure-gage, whereupon the current from the main line is caused to traverse the following circuit: The current flows from the main line-wire L¹ to the wire 121, section 122, binding-post 58, contact 54, wire 124, through coil 103, through wire 123 to contact 53, binding-post 57, wire 176 to binding post A¹, thence through wire 158, contact A, through pointer C and wire 160 to binding-post C¹, thence through wire 161, binding-post 163, wire 162, magnet-switch coil 149, wire 165, binding-post 166, wire 164 to binding-post 196, contact 198, disk 194, contact 199, binding-post 197, wire 164, to resistance-coil 167, thence through this coil, wire 171, wire 173, to binding-post 174, from which binding-post the current passes through the wire 175 to the other main line-wire L. With this circuit established, the coil 149 is energized, thereby causing the arm of the switch 147 to be drawn toward the coil, with the result of establishing contact at two points on the switch-arm with the contacts 154, 156 on the plate. Closing of this switch causes the current from the main line to traverse the following circuit: The current passes from the main line-wire L¹, wire 121, contact 54, wire 124, coil 103, wire 123, to contact 53, as just described; thence from the contact 53, wire 176, to the binding-post 244 connected with the base of the switch 147. The current then passes through the base of this switch, its switch-arm, electrode 152, contact 153, binding-post 154, wire 178, to the terminal 179 of the coil 125; thence through this coil to the binding-post 181, through wire 180, contact 143, disk 137, contact 144 and wire 182, to the binding-post 174, from which binding post the current passes through the wire 175 to the main line-wire L. The current thus established through the solenoid 125 causes it to act upon the plunger 128 and draw the latter upward. The engagement of the plunger at its rack 131 with the pinion 132 on the shaft 26, causes the shaft to be rotated from left to right. Rotation of this shaft first causes the cam 30 to engage the roller of the switch 38, thereby rocking the arm of the switch upon its pivot and causing its electrodes to engage with the contacts 53, 54; further turning of the shaft causes the switches 69, 70, 71, 72 and 73 to successively close, with the result of causing the electrode carried by each of these last-named switches to engage with its respective contact. Still further turning of the shaft causes the switch 59 to close, with the result of engaging its arm with the contacts 62, 63.

As soon as switch 38 closes, the circuit through the motor is established as follows: The current flows from the main line-wire L¹ through the wire 121, section 122, binding-post 58, contact 54, switch-arm 43, to bus-bar 98. From this bar the current passes through wire 120 to the resistance-group 109, thence through the remaining resistance-groups 104 to 108, inclusive, wires 113, 114, to binding-post 66, and thence from the binding-post 66 through the wire L, commutator brushes 238, 239 and interposed commutator 245, to the other section of line-wire L. A circuit is maintained through the field 240 by reason of its connection with the line-wire L at one end, and its connection with the bus-bar 98 at its other end, through the medium of the wire 241.

As each switch 69 to 73, inclusive, is closed, as hereinbefore described, the resistance-groups controlled thereby are each successively cut out of the motor circuit. Thus, for instance, assuming switches 69, 70, 71 to be closed, the current instead of passing through the bus-bar and over the wire 120 through all of the resistance-groups, passes from the bus-bar 98 through the switch 72, contact 91, wire 116 to resistance-group 105, thence through this group and group 104 and wires 113, 114 to binding-post 66.

When switch 56, which is the last to close, closes, all of the resistance groups are cut out and the current passes from the bus-bar through the switch 56 and thence over the main line-wire L.

When the pressure in the tank, through the operation of the motor, rises sufficiently to cause the pointer C to leave the pointer A, the contact at this point is of course broken, but the switch-magnet 147 is maintained in closed condition, by reason of the following-described circuit: When the switch-closing magnet closes, the current passes from the main line-wire L¹ through wire 121, contact 54, arm of the switch 38, contact 53, wire 176, to binding-post 244; thence through switch-arm of switch 147, contact 155, binding-post 156, to wire 246 and binding-post 163; thence through magnet-coil 149 to contact 166, through wire 164 to contact 198, disk 194, contact 199, wire 164, to and through resistance-coil 167; thence through the wire 173 to binding-post 174, the circuit being completed from the binding-post 174 to the main line-wire L through the wire 175. It will thus be understood that as long as current flows through the coil of switch 147, the solenoid will remain energized. When, however, the current through this coil is interrupted, the solenoid becomes deënergized and the plunger 128 descends, for a purpose hereinafter more fully described.

By connecting the solenoid 185 at its terminals through the wires 200, 201 to the wire 121 on opposite sides of its section 122, a shunt through this coil is provided, thereby causing it to become energized as soon as the switch-closing magnet-coil is energized and to remain energized until the current through the wire 121 is interrupted. This coil, as before stated, is provided for the purpose of acting upon the plunger-bar 188, whereby the latter is raised when the current from the main line is fed too rapidly through the motor circuit before described. Thus, when the current becomes excessive, the bar strikes the lower end of the rod 193, thereby raising it and also the disk 194, with the result of breaking contact of the latter with the contacts 198, 199. As the circuit for maintaining the coil of the magnet-switch 147 energized, includes the contacts 198, 199 and disk 194, separation of this disk from the contacts causes the coil 149 to become deënergized, whereupon the arm of the switch 147 opens, by reason of its spring connection. This opening of switch 147 breaks the circuit through the solenoid 125 at the contacts 153 and 156. When the current discontinues flowing through the solenoid 125, the plunger immediately begins to descend, turning the shaft 26 in the opposite direction, thus causing the switches 59, 73, 77, 71, 70, 69 and 38, by reason of their spring connections, to be successively opened, with the result, after switch 38 has opened, of completely breaking the motor circuit. By providing the spring 234, the disk 194, when once raised, as just described, remains in position out of contact with the contacts 198, 199 until the shaft, by its turning, has permitted all of the resistance cut-out switches to open. After the shaft has turned far enough to permit opening of these switches, its lug 235 engages the finger 236, thereby turning the latter, with the result of forcing the rod 193 downward to a position where the disk 194 will again engage the contacts 198, 199. As the switch 38 opens, its electrode 52 leaves the contact 54 immediately, whereas the electrode 47 continues to contact with the contact 53, by reason of the pressure of the spring 49, for a brief period after separation of the electrode 52 and contact 54. As soon as electrode 52 leaves the contact 54, the current, instead of passing from the wire 121 through the binding-post 58 and contact 54 to the switch-arm 43, and thence to the bar 98, passes from the wire 121 through the binding-post 58 to contact 54, thence through wire 124, coil 103, wire 123, contact 53 and electrode 47, to arm 43. Thus, the final break of the current through the switch 43 and the motor circuit is effected at the electrode 47 at a time when the blow-out coil 103 is energized. The arc thus formed between the electrode 47 and the contact 53 is blown out in a well-known manner.

Where, in the operation of the device, the current supplied through the wire 164 and the contact-making-and-breaking device interposed therein, and the current supplied through the solenoid 125 is not sufficient to energize the solenoid to such an extent as to cause the bar 188 to raise the disk 194, the plunger 128 rises in the solenoid sufficiently far to close all the resistance cut-out switches and thus direct the full main-line current through the motor circuit. As the plunger 128 nears the limit of its upward stroke, it engages the lower end of the plunger 135, thereby raising it and the disk 137 out of engagement with the contacts 143, 144. The object of effecting this disengagement after all the resistance-groups are cut out, is to reduce the amount of current through the solenoid 125 through the interposition of a resistance, and thus direct through this solenoid only so much current as is needed for holding the plunger in extreme raised position. When the disengagement of the disk 137 with the contacts 143, 144 takes place, the current, instead of passing from contact 143 to 144, through the disk 137 and thence by the wire 182 to binding-post 174, passes from contact 143 over the wire 183 to resistance coil 169, thence through this coil and wires 172, 173 to binding-post 174. The motor will continue to operate until the pressure in the reservoir becomes sufficiently great to cause the pointer C to engage the contact B, whereupon the current through the coil 149 of the magnet-switch 147 will be interrupted through a short-circuit, as follows: The current, instead of passing from the wire 246 through the binding-post 163, wire 162, coil 149, wires 165 and 164, to contact 198, passes from the wire 246 to contact 163, thence through wire 161 to binding-post C', thence through wire 160, pointer C, contact B, wire 159, binding-post B¹, binding-post 166 and wire 164, to contact 198. By short-circuiting the coil 149 it becomes deenergized and the switch 147 opens, thereby breaking the circuit through the solenoid 125 and returning the motor-circuit switches to their normal open position, thus breaking the circuit through the motor. The motor remains inoperative until the pressure in the reservoir drops sufficiently low to cause the pointer C to again engage the contact A, whereupon the switch 147 closes and the operation of solenoid 125, as before described, is repeated. Thus, the pressure in the reservoir is caused to be automatically maintained between certain degrees.

The hand-device for actuating the shaft, as before stated, is for use independently of the electrically-controlled means. In the connection in which it is shown in the drawings, it is used primarily as an emergency device in the event of the failure of operation of the solenoid 125. When it is desired to manually operate the device, the handle 204 is grasped by the operator and turned upwardly, with the result, through the engagement of the pawl 210 with the head 205 of the handle, as before described, of turning the sleeve 206 and with it the shaft. Turning of the shaft causes the switches controlled thereby, as hereinbefore explained, to be successively closed, thereby directing the current from the main line into the circuits, as above stated. The retaining magnet 216 serves to hold the arm 204 at its armature 217 in raised position, thereby maintaining the motor-circuit switches in closed condition until the handle is pulled away from the coil. The circuit for maintaining the coil 216 in charged condition is as follows: As before stated, as soon as switch 38 closes, the current from the main line passes through wires L¹ and 121 to contact 54, thence through switch 38 to binding-post 55, thence through bar 98 and resistance-groups to wires 113, 114, thence to binding post 66 and out over the main line-wire L. A portion of this current is shunted from the binding-post 56 through the wire 220, post 219, coil 216, post 222, wire 223, resistance-coil 168, wires 171 and 173, binding-post 174 and wire 175, to the main line-wire L.

Should the current through the motor circuit and solenoid 125, during the operation of closing the resistance cut-out switches, be fed so rapidly through these circuits as to overload the motor, the bar 188 will be raised sufficiently high to cause the member 228 to be turned on its pivot, with the result of turning the trip-device 224, thereby disengaging the pawl 210 from the head 205 of the handle 204. As soon as this disengagement takes place, the shaft is free to return to its normal position, under the action of the descending plunger 128, or any other suitable device. With the cams on the shaft thus turned out of relative position with the various switches with which they engage, the latter, by reason of their spring connections, automatically open and break the circuit through the motor. It will thus be seen that the shaft and the sleeve 206 with its extension, return to their normal position, and that to again operate the shaft it is necessary that the handle be returned to its normal lowered position, from which it may be again operated to turn the shaft. Thus, it is impossible for an operator to introduce the current from the main line into the motor circuit with sufficient rapidity to cause overloading of the motor.

It will of course be understood that where the device is to be used merely as a hand starter, the solenoid 125 and the parts operating with it, the switch-closing magnet, the pressure-gage, the contacts 198, 199, disk 194, resistance-coil 169 and the circuit connections between these devices and parts, may be eliminated from the starting-device, as they perform no function in connection with the hand-starting means.

By operating the switches 38 and 69 to 73, inclusive, and 59, by the cam-equipped shaft, their operation is rendered positive, thereby affording a device the operation of which is thoroughly reliable.

By forming the plunger with a lower section movably supported with relation to the body-portion of the plunger, the latter is caused to move upward with a quick movement until it starts to raise the lower section. Thus switch 38 is immediately closed as soon as the current is caused to flow through the solenoid-coil 136.

What I claim as new, and desire to secure by Letters Patent, is:

1. In an automatically-controlled electrical starting-device, the combination of a series of separate switches and resistance-groups controlled thereby adapted to be interposed in an electrical circuit, a shaft, means operated by the shaft for operating the switches in succession, non-manual automatically electrically operated means for actuating the shaft, and manually-operated means for operating the shaft, serving, in combination with said electrically-operated means, as an emergency device.

2. In an automatically-controlled electrical starting-device, the combination of an electrical circuit, a switch for closing said circuit, a resistance in said circuit, a device for short-circuiting said resistance, non-manual automatically electrically-operated means for operating said switch and device, and manually-operated means for operating said switch and device, said manually-operated means serving, in combination with said electrical operating means, as an emergency device.

3. In an automatically-controlled electrical starting-device, the combination of a series of separate switches and resistance-groups controlled thereby adapted to be interposed in an electrical circuit, a shaft, means operated by the shaft for operating the switches in succession, non-manual automatically electrically-operated means for actuating said shaft, and a manually-operated lever so connected with the shaft as to permit the latter to be operated through the medium of said lever when the lever is operated, but to prevent the lever from being operated when the shaft is turned by said electrically-operated means, said lever serving, in combination with said electrical operating means, as an emergency device.

4. In an electrical starting device, the combination of a series of switches and resistance-groups controlled thereby adapted to be interposed in an electrical circuit, a shaft, means operated by the shaft for operating the switches, a lever constructed and arranged to releasably engage with the shaft for turning the same, and means constructed and arranged to disengage the lever from the shaft when the operation of cutting out the resistance-groups causes the rate of increase of current through said circuit to exceed a predetermined amount.

5. In an electrical starting-device, the combination with an electrical circuit, of a series of switches and resistance-groups controlled by them in said circuit, a shaft, means operated by the shaft for operating the switches, a handle constructed and arranged to releasably engage with the shaft for turning the same, a solenoid, means actuated by the solenoid for disengaging the lever from the shaft, and means for energizing the solenoid to actuate said first-named means when the operation of cutting out the resistance-groups causes the rate of increase of current through said second circuit to exceed a predetermined amount.

6. In an electrical starting-device, the combination of a series of switches and resistance-groups controlled thereby adapted to be interposed in an electrical circuit, a shaft, means operated by the shaft for operating the switches, a swinging lever, a catch movable with the shaft and adapted to releasably engage the lever, and means for disengaging the catch from the lever, for the purpose set forth.

7. In an electrical starting-device, the combination of a series of switches and resistance-groups controlled thereby adapted to be interposed in an electrical circuit, a shaft, means operated by the shaft for operating the switches, a swinging lever, a catch movable with the shaft and adapted to releasably engage the lever, a trip-device carried by the lever for disengaging the catch from it, and means for actuating the trip-device, for the purpose set forth.

8. In an electrical starting-device, the combination of a series of switches and resistance-groups controlled thereby adapted to be interposed in an electrical circuit, a shaft, means operated by the shaft for operating the switches, a swinging lever, a catch movable with the shaft and adapted to releasably engage the lever, a trip-device for engaging the catch to disengage it from the lever, a solenoid constructed and adapted to be actuated by current supplied from said circuit, and means actuated by the solenoid for engaging the trip-device, for the purpose set forth.

9. In an electrical starting-device, the combination of a series of switches and resistance-groups controlled thereby adapted to be interposed in an electrical circuit, a shaft, means operated by the shaft for operating the switches, a swinging lever, a catch movable with the shaft and adapted to releasably engage the lever, a trip-device carried by the lever to disengage it from the catch, a trip-engaging member constructed and arranged to engage said trip for actuating the latter to operate the catch, and means for actuating said trip-engaging member.

10. In an electrical starting-device, the combination of a series of switches and resistance-groups controlled thereby adapted to be interposed in an electrical circuit, a shaft, means operated by the shaft for operating the switches, a lever journaled on the shaft, a catch movable with the shaft and constructed and arranged to releasably engage the lever, a trip-device pivoted between its ends on the lever for engaging the catch near one of its ends, for moving the catch and disengaging it from the lever, a trip-engaging member constructed and arranged to engage the other end of the trip-device, and means for actuating said trip-engaging means.

11. In an electrical starting-device, the combination with an electrical circuit, of a series of switches and resistance-groups controlled thereby in said circuit, means for operating the switches in succession to successively cut out said resistance-groups, and means constructed and arranged to interrupt the operation of said switch-operating means when the operation of cutting out the resistance-groups causes the rate of increase of current through said circuit to exceed a predetermined amount and to prevent subsequent operation of said switch-operating means to again close said circuit until all of the resistances have again been interposed in said circuit.

12. In an electrical starting-device, the combination with an electrical circuit, of a series of switches and resistance-groups controlled thereby in said circuit, means for operating said switches in succession to successively cut out said resistance-groups, said switches and operating-means being so constructed and arranged as to cause the switches to return to open condition when the operation of said operating-means is interrupted, and means constructed and arranged to interrupt the operation of said switch-operating means when the operation of cutting out the resistance-groups causes the rate of increase of current through said circuit to exceed a predetermined amount and to prevent subsequent operation of said switch-operating means to again close said circuit until all of the resistances have again been interposed in said circuit.

13. In an electrical starting-device, the combination with an electrical circuit, of a series of switches and resistance-groups controlled thereby in said circuit, a rotatable shaft, means on the shaft for successively engaging said switches to successively cut out said resistance-groups, means for rotating the shaft, means constructed and arranged to interrupt the operation of said shaft-operating means when the operation of cutting out the resistance-groups causes the rate of increase of current through said circuit to exceed a predetermined amount, and to prevent subsequent operation of said shaft-operating means to again operate said shaft to again close said circuit until the shaft has turned to normal position and all of said switches have been opened, and means for returning the shaft to normal position to permit the switches to be returned to open condition, for the purpose set forth.

14. In an electrical starting-device, the combination with an electrical circuit, of a series of switches and resistance-groups controlled thereby in said circuit, a rotatable shaft, cams on the shaft constructed and arranged to successively engage with said switches to close them and successively cut out said resistance-groups, means for rotating the shaft, means constructed and arranged to interrupt the operation of said shaft-operating means when the operation of cutting out the resistance-groups causes the rate of increase of current through said circuit to exceed a predetermined amount, and to prevent subsequent operation of said shaft-operating means to again operate said shaft to again close said circuit until the shaft has turned to normal position and all of said switches have been opened, and means for returning the shaft to normal position to permit the switches to be returned to open condition, for the purpose set forth.

15. In an electrical starting-device, the combination with an electrical circuit, of a series of switches and resistance-groups controlled thereby in said circuit, means for operating the switches in succession to successively cut out said resistance-groups, means constructed and arranged to interrupt the operation of said switch-operating means when the operation of cutting out the resistance-groups causes the rate of increase of current through said circuit to exceed a predetermined amount and to prevent subsequent operation of said switch-operating means to again close said circuit until all of the resistances have again been interposed in said circuit, and means for returning said switch-operating means to normal position to permit the switches to be returned to open condition, for the purpose set forth.

16. In an electrical starting-device, the combination with an electrical circuit, of a series of switches and resistance-groups controlled thereby in said circuit, a rotatable shaft, means on the shaft for successively engaging with the switches to successively cut out the resistance-groups when the shaft is rotated, a solenoid, the core of the solenoid operatively engaging with the shaft, and tending to maintain the latter in normal position in which the switches are open, and a hand-lever releasably engaging the shaft, for the purpose set forth.

17. In an electrical starting-device, the combination of a series of switches and resistance-groups controlled thereby in said circuit, a movable member carrying means constructed and arranged to operate the switches in succession when said member is moved, means tending to maintain the said member in a position in which the switches are in open condition, means for moving said movable member, and means constructed and arranged to disengage said movable-member-operating means from the movable member when the operation of cutting out the resistance-groups causes the rate of increase of current through said circuit to exceed a predetermined amount and thereby permit said movable member to return to normal position and the switches to move to open position.

18. In an electrical starting-device, the combination of a series of switches and resistance-groups controlled thereby in said circuit, a rotatable shaft, means operated by said shaft for operating the switches in succession to successively cut out the resistance-groups, means for operating the shaft, means tending to maintain the shaft in a position in which the switches are in open condition, and means constructed and arranged to interrupt the operation of said shaft-turning means and to permit the shaft to be returned to normal position and prevent further actuation of the shaft by the said shaft-actuating means, when the operation of cutting out the resistance-groups causes the rate of increase of current through said circuit to exceed a predetermined amount, until all of the switches have returned to open condition.

19. In an electrical starting-device, the combination of a series of switches and resistance groups controlled thereby in said circuit, a rotatable shaft, means operated by said shaft for operating the switches in succession to successively cut out the resistance-groups, hand-operated lever mechanism constructed and arranged to releasably engage with the shaft for turning it, means tending to maintain the shaft in a position in which the switches are in open condition, and means constructed and arranged to disengage the lever from the shaft and to permit the shaft to be returned to normal position and prevent further actuation of the shaft by the said shaft-actuating means, when the operation of cutting out the resistance-groups causes the rate of increase of current through said circuit to exceed a predetermined amount, until all of the switches have returned to open condition.

JACOB L. SCHUREMAN.

In presence of—
  W. B. DAVIES,
  R. A. SCHAEFER.